US005644418A

United States Patent [19]
Woodward

[11] Patent Number: 5,644,418
[45] Date of Patent: Jul. 1, 1997

[54] SMART PIXEL OPTICAL RECEIVER EMPLOYING SENSE AMPLIFIER AND METHOD OF OPERATION THEREOF

[75] Inventor: Ted K. Woodward, Holmdel, N.J.

[73] Assignee: Lucent Technologies Inc., Murray Hill, N.J.

[21] Appl. No.: 570,171

[22] Filed: Dec. 7, 1995

[51] Int. Cl.$^6$ .................................................. H04B 10/06
[52] U.S. Cl. .................... 359/189; 359/194; 250/214 A
[58] Field of Search .................................. 359/189, 190, 359/191, 192, 194, 195; 250/214 A; 327/514

[56] References Cited

U.S. PATENT DOCUMENTS

| | | | |
|---|---|---|---|
| 4,713,841 | 12/1987 | Porter et al. | 359/189 |
| 5,239,402 | 8/1993 | Little, Jr. et al. | 359/194 |
| 5,389,776 | 2/1995 | Woodward | 250/214 |
| 5,532,471 | 7/1996 | Khurramabadi et al. | 250/214 A |

OTHER PUBLICATIONS

Clocked–Sense–Amplifier–Based Smart–Pixel Optical Receivers, Woodward et al, IEEE Photonics Technology Letters, vol. 8 No. 8 Aug. 1996 pp. 1067–1069.

*Primary Examiner*—Wellington Chin
*Assistant Examiner*—Rafael Bacares

[57] ABSTRACT

An optical receiver, a method of converting an optical signal into an output electrical signal suitable for use by digital circuitry and an optoelectronic data processing system. The optical receiver includes: (1) an optical sensor for receiving an optical signal, generating in response thereto an analog electrical signal and transmitting the analog electrical signal therefore along an electrical path and (2) a sense amplifier having cross-coupled inverting amplifiers and a clock input, at least one of first and second inputs of the sense amplifier coupled to the electrical path, respectively, to allow the sense amplifier to detect the analog electrical signal when a clock signal at the clock input is high, regenerative feedback within the sense amplifier driving the first and second outputs to complementary logic levels when the clock signal is low, the clock signal controlling the regenerative feedback of the sense amplifier to amplify the analog electrical signal into an output electrical signal provided at the first and second outputs and suitable for use by digital circuitry operating as part of an optoelectronic data processing system.

20 Claims, 5 Drawing Sheets ns5,644,418

SMART PIXEL OPTICAL RECEIVER EMPLOYING SENSE AMPLIFIER AND METHOD OF OPERATION THEREOF

TECHNICAL FIELD OF THE INVENTION

The present invention is directed, in general, to optical receivers and, more specifically, to an optical receiver for use in smart pixel and interconnect technologies that employs a clocked sense amplifier for amplifying an input signal supplied by an optical sensor to a desired output amplitude.

BACKGROUND OF THE INVENTION

Information may be transmitted through an optical fiber by means of binary digital transmission, whereby the information to be conveyed is converted into a stream of light pulses, where the presence of a pulse corresponds to the transmission of a binary "one," and the absence of light corresponds to the transmission of a binary "zero." The purpose of an optical receiver is to convert this stream of light pulses into an electrical signal and to recover from the electrical signal whatever information had been impressed on the optical carrier that carries the information through the optical fiber.

Classic telecommunications systems have optical receivers consisting of three basic components; generally, an analog front-end that receives the optical signal and produces an analog electrical replica thereof; a bandwidth limiting filter element, and a synchronous and or asynchronous digital decision circuit. Specifically, illustrated in FIG. 1 is a high level block diagram of such a prior art optical receiver 100. Of particular importance to an understanding of the novelty of the present invention is that the optical receiver design existing in the prior all required only a single optical transmission path. This characteristic is extremely important to the field of telecommunications because telecommunications systems are typically designed to communicate over great distances. Thus, the use of a single transmission path, requiring only a single optical fiber, is the most efficient means. The design and operation of optical receiver 100, which is well known in the art of telecommunications systems, is discussed more fully in the Detailed Description provided hereinafter. Although the optical receiver 100 design is well-suited to telecommunications systems, its design is not appropriate to application in the emerging field of integrated optoelectronics, commonly referred to as "smart pixel" systems.

"Smart Pixel" is a generic term applied to an emerging field of optical interconnection within and between digital computing systems such as switching systems and parallel-processor systems. In one implementation of the "smart pixel" concept, large numbers of optical transmitters and receivers would be directly integrated with semiconductor electronic processing elements. This integration is made possible by the similar manufacturing processes and materials required for optical components and semiconductor components. In such integrated optoelectronic circuits, the optical receiver circuit is worth careful study because the efficiency of its design, along with the maximum optical power that a transmitter can handle and the optical loss of the transmission system, defines the optical power budget for the optoelectronic system. Additionally, as optical receiver sensitivities improve, advantages accrue to the system in terms of the maximum number of channels, power consumption, and processing power. Whereas these devices are integrated directly on the semiconductor substrate with digital electronic processing circuitry, there exists a desire to minimize the power requirements of the optical receiver elements. Additionally, because of the desired large-scale integration of optical and electronic circuits, the optical receiver circuit should occupy a minimum of area on the semiconductor substrate.

The deficiency of the prior art, to which the object of the present invention is directed, is that the design and construction of the optical receiver 100 known to the field of telecommunications systems is not well suited to applications in the emerging art of smart pixel technology. Specifically, the prior art optical receiver 100 would consume a large amount of power and semiconductor area, thus creating a need for a more compact and efficient solution for use in "smart pixel" systems.

Accordingly, what is needed in the art is an optical receiver that requires a minimum of semiconductor space. There exists a further need in the art to minimize the power dissipation of optical receivers for use in smart pixel systems.

SUMMARY OF THE INVENTION

To address the above-discussed deficiencies of the prior art, the present invention provides an optical receiver, a method of converting an optical signal into an output electrical signal suitable for use by digital circuitry and an optoelectronic data processing system. The optical receiver includes: (1) an optical sensor for receiving an optical signal, generating in response thereto an analog electrical signal and transmitting the analog electrical signal therefrom along an electrical path and (2) a sense amplifier (well known in the field of semiconductor memory technology, but generally unknown in the field of optical receivers), having cross-coupled inverting amplifiers and a clock input, at least one of first and second inputs of the cross-coupled inverting amplifiers coupled to the electrical path to allow the sense amplifier to detect the analog electrical signal when a clock signal at the clock input is high, regenerative feedback within the sense amplifier driving the first and second outputs to complementary logic levels when the clock signal is low, the regenerative feedback of the sense amplifier controlled with the clock signal to amplify the analog electrical signal into an output electrical signal provided at the first and second outputs and suitable for use by digital circuitry.

The present invention therefore combines two heretofore disparate and nonanalogous technologies—smart pixel optical receivers and semiconductor memory technology—to produce an optical receiver that amplifies and converts the input optical signal into the output electrical signal, requiring substantially less power and semiconductor substrate area than prior art receivers. The smart pixel optical receiver of the present invention may thus be employed to advantage in an optoelectronic data processing system comprising electronic general purpose digital data processing and storage circuitry for receiving, processing, generating and transmitting data in electronic form.

In a preferred embodiment of the present invention, the optical sensor of the optical receiver is selected from the group consisting of: (1) a p-i-n photo diode and (2) a metal semiconductor metal ("MSM") photo diode. Those of ordinary skill in the communications art are familiar with many different types of optical sensor, including the two specific types alternatively employable in this preferred embodiment. The present invention, in its broadest form, encompasses all forms of optical sensors.

In a preferred embodiment of the present invention, the receiver further comprises a clamped-bit-line sense amplifier having cross-coupled inverting amplifiers and a clock input. The first and second inputs of the cross-coupled inverting amplifiers are coupled to first and second optical sensors by first and second electrical paths, respectively, to allow the sense amplifier to detect an analog electrical signal generated by the first and second optical sensors when a clock signal at the clock input is high. When the clock signal is low, regenerative feedback within the sense amplifier drives first and second outputs of the sense amplifier to complementary logic levels suitable for use by digital circuitry. The clock signal is thus used to control the regenerative feedback of the sense amplifier, whereby the analog electrical signal generated by the first and second optical sensors is amplified into an output electrical signal provided at the first and second outputs of the sense amplifier. In the Detailed Description to follow, alternative embodiments of the present invention will be illustrated and described. Further, several alternative sense-amplifier topologies will be shown and described. Those of ordinary skill in the art should recognize that the broad scope of the present invention encompasses all forms of amplifier circuits employing clock-controlled regenerative feedback, as in a sense amplifier.

Some embodiments of the present invention employ first and second optical sensors coupled by first and second electrical paths to first and second sense-amplifier inputs. Other embodiments may employ but a single optical sensor coupled by an electrical path to one of the first and second sense-amplifier inputs; the other of the first and second sense-amplifier inputs is coupled to an electrical reference circuit.

In a preferred embodiment of the present invention, the clock signal is selected from the group consisting of: (1) an electrical signal and (2) an optical signal. Thus, the clock signal may be delivered to the receiver via an optical fiber or an electrical conductor, as appropriate in a particular application. Optical clock distribution is discussed by Goodman, et al. in Proc. IEEE, Vol. 72, no.7, pp. 159–175 (July 1984), incorporated herein by reference.

In a preferred embodiment of the present invention, the output electrical signal is provided at a complementary metal oxide semiconductor ("CMOS") logic level. Thus, the output electrical signal is preferably appropriate for use in CMOS circuitry downstream of the optical receiver. Those of ordinary skill in the art will recognize, however, that certain applications require other than a CMOS logic level output. The present invention encompasses other logic levels, as well.

In a preferred embodiment of the present invention, the inverting amplifiers comprise a plurality of field effect transistors ("FETs"). Those of ordinary skill in the art will recognize, however, that itching devices other than FETs may be employed to advantage in certain applications.

In a preferred embodiment of the present invention, the analog electrical signal corresponds to a bit period of less than 10 nanoseconds. Thus, it can readily be seen that the present invention is preferably designed to provide rapid detection, amplification and conversion of the analog electrical signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
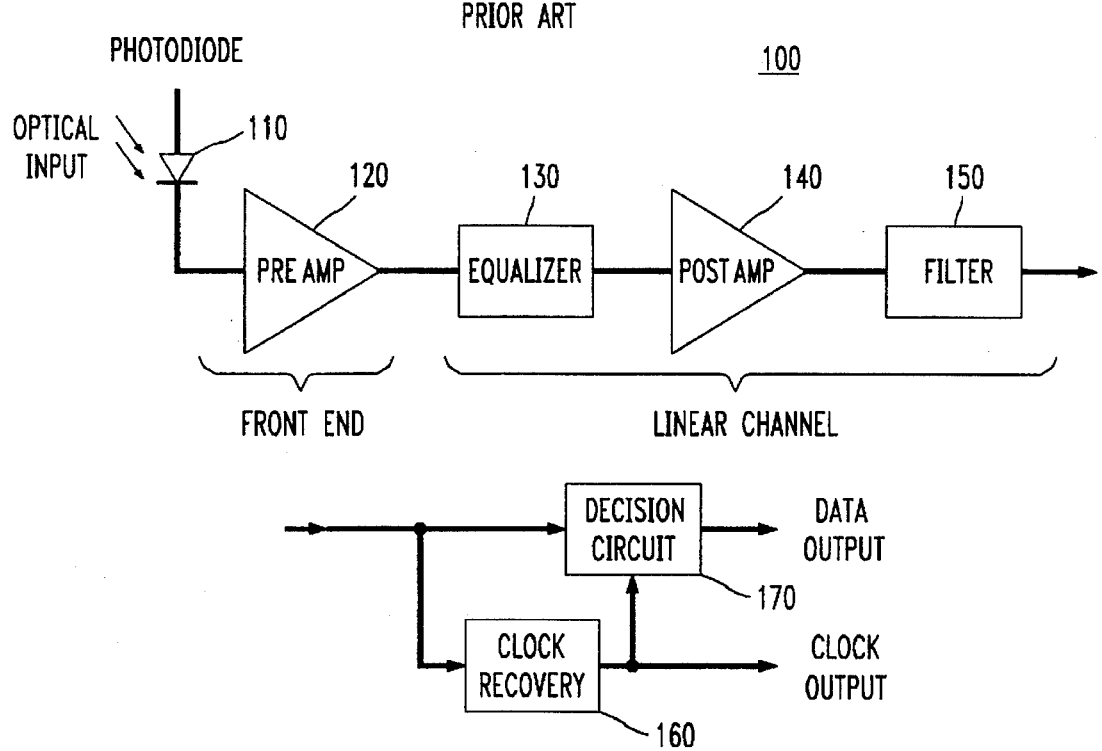
FIG. 1 illustrates a high-level block diagram of a prior art optical receiver.

Referring first to FIG. 1, illustrated is a high-level block diagram of a prior art optical receiver 100 that is known in the field of telecommunications systems. The photo diode 110 detects an optical signal and produces an electrical output that is amplified by a low-noise preamplifier 120. The preamplifier 120 is followed by the receiver's linear-channel section comprised of an equalizer 130, a high-gain postamplifier 140, and a low-pass filter 150. To accurately decode the binary information received, it is also often necessary for the optical receiver 100 to extract timing information from the received signal. For this purpose, a portion of the linear-channel output is directed to a clock recovery circuit 160 that is then used to control the operation of the final receiver stage comprised of the decision circuit 170. The operation of the optical receiver 100 reproduced in FIG. 1 is well known in the art of telecommunications systems, and its operation more fully discussed in *Optical Fiber Telecommunications II*, edited by Stewart E. Miller and Ivan P. Kaminow (1993), Chapter 18, incorporated herein by reference. The deficiency of the prior art to which the object of the present invention is directed is that the design and construction of the optical receiver 100 known to the art of telecommunications systems is not well suited to applications in the emerging art of smart pixel and interconnect technologies.

Those skilled in the art of classic fiber-optic telecommunications systems and those skilled in the art of "smart pixel" systems are faced with highly dissimilar constraints and assumptions in designing an optical receiver. In particular, those skilled in the art of telecommunications systems are generally concerned with non-localized systems, meaning that the optical communications traverse great distances.

Conversely, those practicing the art of "smart pixel" and interconnect technologies assume the system to be local. Whereas the system is local, it is not a disadvantage, as it would be in a telecommunications system, to use more than one optical beam to transmit the desired signal. Additionally, the local nature of a "smart pixel" system has the advantage of direct access to timing information, obviating the need for clock recovery circuitry 160 of prior art optical receiver 100. Furthermore, systems implementing "smart pixel" technology may employ thousands of optical receivers on a single integrated circuit, which imposes new constraints as compared to a traditional telecommunications-grade optical receiver; principally, the desire for low power-consumption and minimum semiconductor substrate area.

Figure 2:
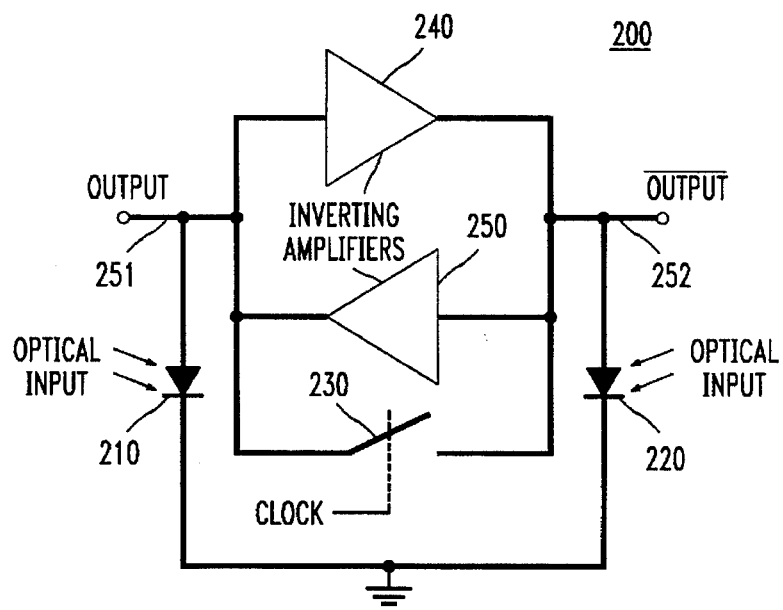
FIG. 2 illustrates a high-level block diagram of the clocked sense-amplifier-based optical receiver of the present invention.

Turning now to FIG. 2, illustrated is a high-level block diagram of the optical receiver 200 of the present invention. Functionally, the optical receiver 200 is comprised of photo diodes 210, 220, clocked-controlled switch 230, and inverting amplifiers 240, 250. Those skilled in the art of digital electronic circuits, particularly the design of integrated memory circuits, will recognize that the cross-coupled inverting amplifiers 240, 250 and clock-controlled switch 230 represent, functionally, a flip-flop circuit, commonly used as a clocked sense amplifier in static and dynamic integrated memory circuits. The simple and efficient design of a clocked sense amplifier, with its characteristic regenerative feedback, is a principle advantage of the optical receiver design of the present invention, for use in smart-pixel systems, over the use of optical receiver circuits existing in the prior art.

Referring to FIG. 2, the operation of the clocked sense amplifier optical receiver 200 is governed by clock-controlled switch 230. The clock signal for clock-controlled switch 230, according to one aspect of the present invention, may be supplied optically or electronically. During operation, when switch 230 is open, the outputs 251, 252 of the optical receiver 200 are at complementary logic levels "1" and "0," and no inputs are applied. When the switch is closed, the outputs 251, 252 are equal to one another, and the inputs are then applied. When the clock-controlled switch 230 is again opened, the inputs cause one of the outputs 251, 252 of the sense amplifier to rise to a higher electrical potential than the other, and regenerative feedback from the cross-coupled inverters 240, 250 drives the outputs 251, 252 to complementary logic levels representative of the input datum and the inverse of the datum.

There are a variety of specific implementations for the optical receiver of the present invention based on adaptations of various designs of clocked sense amplifiers found in the art of semiconductor memory technology. Several embodiments of the present invention, based on various clocked sense amplifier configurations, are provided herein for completeness. Because the operation of clocked sense amplifiers is well-known in the field of semiconductor memory technology, the detailed operation of the clocked sense amplifier portions of the embodiments of the present invention illustrated hereinafter will not be repeated here.

Figure 3:
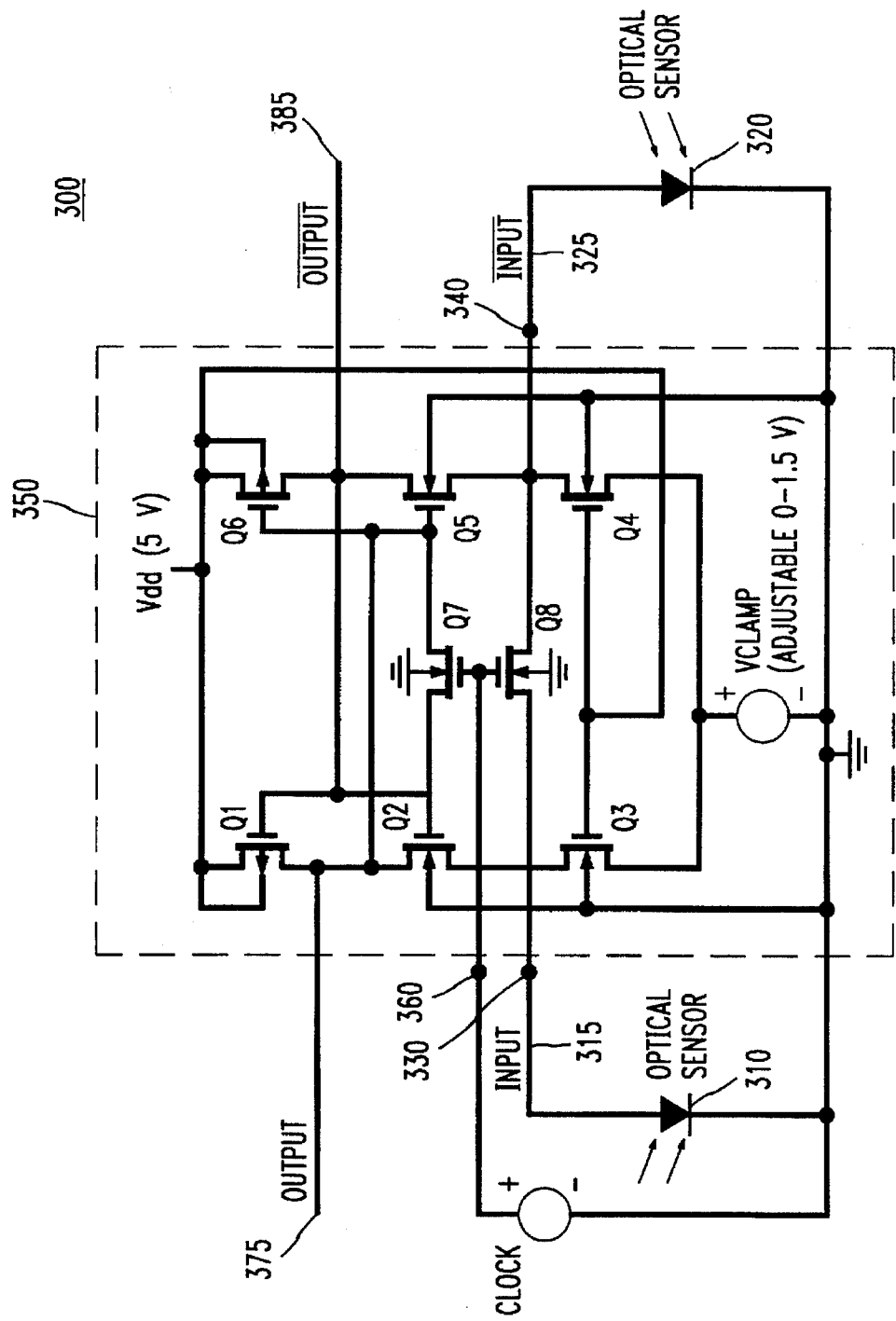
FIG. 3 illustrates a schematic diagram of a first embodiment of the clocked sense-amplifier-based optical receiver of FIG. 2 wherein the clocked sense amplifier is of the clamped-bit-line type.

Turning now to FIG. 3, illustrated is a schematic diagram of a first embodiment of the optical receiver 200 of FIG. 2 wherein the clocked sense amplifier is of the clamped-bit-line type known to the art of semiconductor memory technology. In this embodiment, the optical receiver 300 is comprised of optical sensors 310, 320 suitably designed to receive an optical signal and generate in response thereto an analog electrical signal. Optical sensors suitable for use in the present invention include, without limitation, p-i-n and MSM photo diodes. The analog electrical signals generated by optical sensors 310, 320 are transmitted along first and second electrical paths 315, 325 to the inputs 330, 340 of a clamped-bit-line sense amplifier 350. Those of ordinary skill in the art of semiconductor memory technology will readily understand the operation of clamped-bit-line sense amplifier 350. A description of clamped-bit-line sense amplifiers may be found in *A High Speed Clamped-bit-line Current Mode Sense Amplifier*, by Travis N. Blalock, and Richard C. Jaeger, IEEE J. Solid State Circuits, v. 26, no. 4, 1991, pp. 542–548, and also, by the same authors, *A High-Speed Sensing Scheme for 1 T dynamic RAMs Utilizing the Clamped Bit Line Sense Amplifier*, IEEE J. Solid State Circuits, v. 27, no. 4, 1992, pp. 618–625, incorporated herein by reference. The clamped-bit-line sense amplifier 350 has inputs and outputs comprised of clock input 360, first and second inputs 330, 340 coupled to first and second electrical paths 3 15, 325, respectively, and first and second outputs 375, 385.

The clamped-bit-line sense amplifier 350 is suitably designed to detect an analog electrical signal generated by optical sensors 310, 320 when a clock signal at clock input 360 is high (near 5 volts for standard CMOS circuitry). When the clock signal at clock input 360 is low (near 0 volts for standard CMOS circuitry), regenerative feedback within the clamped-bit-line sense amplifier 350 drives the first and second outputs 375, 385 to complementary logic levels representative of optical datum received by optical sensors 310, 320. More specifically, the clamped-bit-line sense amplifier 350 is suitably designed to internally generate a current related to the difference in optical input power received by optical sensors 310, 320 when the clock signal at clock input 360 is high. The sense of this current determines the logical state to which the outputs 375, 385 of sense amplifier 350 are driven by the regenerative feedback that occurs when the clock signal at clock input 360 is low. The clamped-bit-line sense amplifier 350 thereby controls the regenerative feedback with the clock signal to amplify the analog electrical input signals generated by optical sensors 310, 320 into output electrical signals provided at the first and second outputs 375, 385 and suitable for use by digital circuitry.

Figure 4:
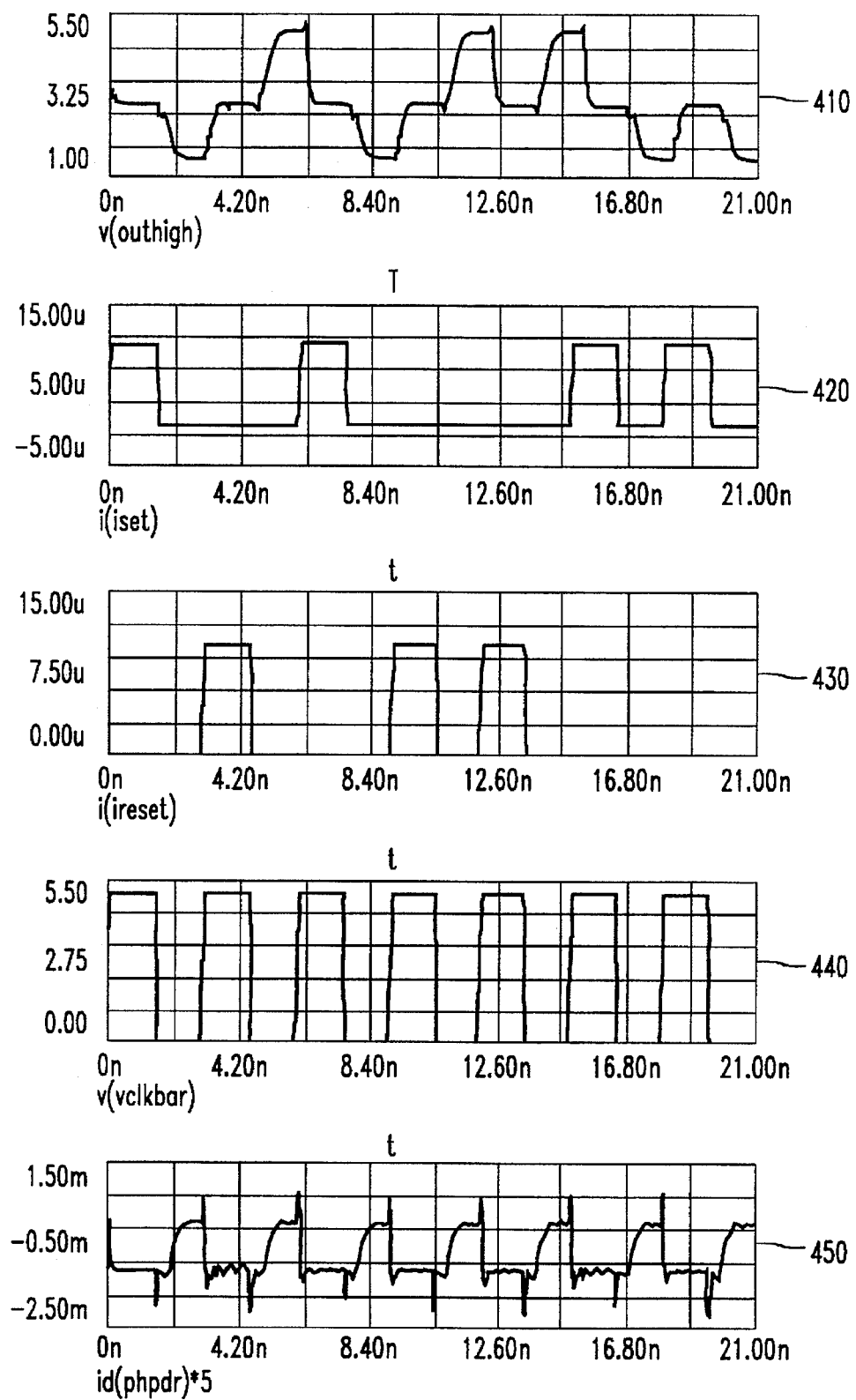
FIG. 4 illustrates graphical plots of computer simulated input and output signal characteristics of the first embodiment of FIG. 3.

Turning now to FIG. 4, illustrated are graphical plots of input and output signal characteristics of the first embodiment of FIG. 3 derived from computer simulation results using 3 μA input current levels to model the electrical signals generated by optical sensors 310, 320. Plots 420 and 430 present, respectively, model input waveforms generated by optical sensors 310, 320 of optical receiver 300 of FIG. 3. Plot 440 is a model representation of the clock signal present at clock input 360 of optical receiver 300 of FIG. 3. Plot 410 provides the voltage waveform at output 385 of optical receiver 300 of FIG. 3 in response to the model input waveforms illustrated in plots 420, 430 and the model clock signal illustrated in plot 440. Assuming that the current generated internally to sense amplifier 350 of FIG. 3 flows through a voltage potential of 5 V, plot 450 illustrates the static dissipation in milliwatts (mW) for the optical receiver 300 of FIG. 3. The maximum value of the static dissipation for optical receiver 300 is 1.2 mW for an average dissipation of 0.6 mW. As described in *Optical Receivers for Smart Pixel Applications* by T. K. Woodward, IEEE Laser and Electrooptics Society Annual Meeting (1995), Technical Digest p. 67, incorporated herein by reference, prior art optical receivers having only elements 110 and 120 of FIG. 1 typically dissipate between 3.5 and 8 mW. Thus, an advantage of the design of the optical receiver of the present invention is a reduction in power dissipation by as much as 92.5 percent.

Figure 5:
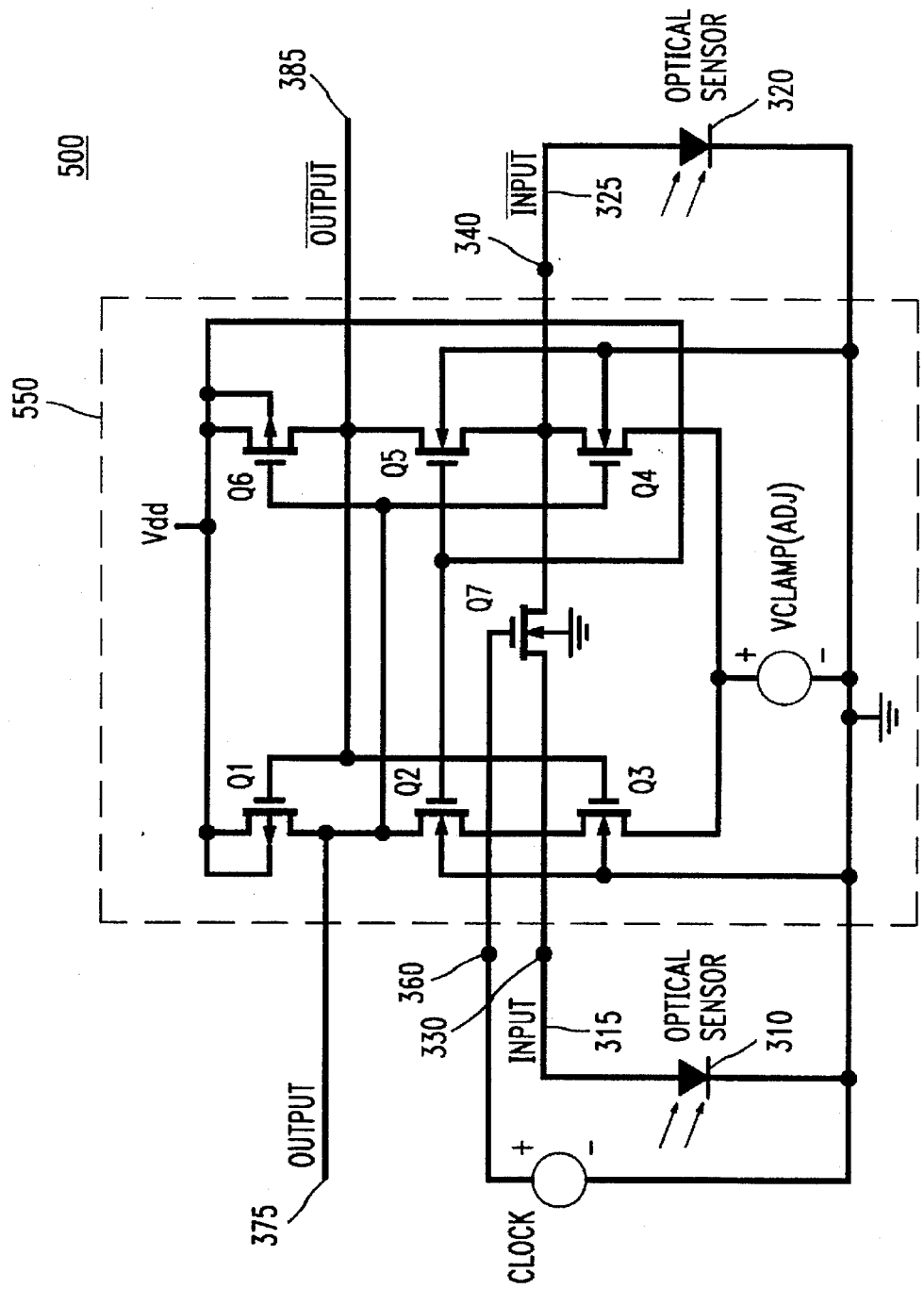
FIG. 5 illustrates a schematic diagram of a second embodiment of the clocked sense-amplifier-based optical receiver of FIG. 2 wherein the clocked sense amplifier is of a conventional design.

Turning now to FIG. 5, illustrated is a schematic diagram of a second embodiment of the optical receiver of FIG. 2 wherein the clocked sense amplifier is of a conventional type known to the art of semiconductor memory technology. Optical receiver 500 is identical to optical receiver 300 of FIG. 3 with the exception that the clamped-bit-line sense amplifier 350 of optical receiver 300 has been replaced with a conventional sense amplifier 550. All other details regarding the design and operation of the optical receiver 500 are the same as discussed supra with respect to optical receiver 300 and will not be repeated here.

Alternate embodiments of the present invention may utilize circuitry wherein only one optical sensor is employed. In such embodiments, the electrical signal provided to one of inputs 330, 340 of sense amplifier 350 is provided by an appropriate electrical reference circuit. It is an advantage of such embodiments that only one optical transmission path is required to communicate between smart pixel circuits and systems.

Figure 6:
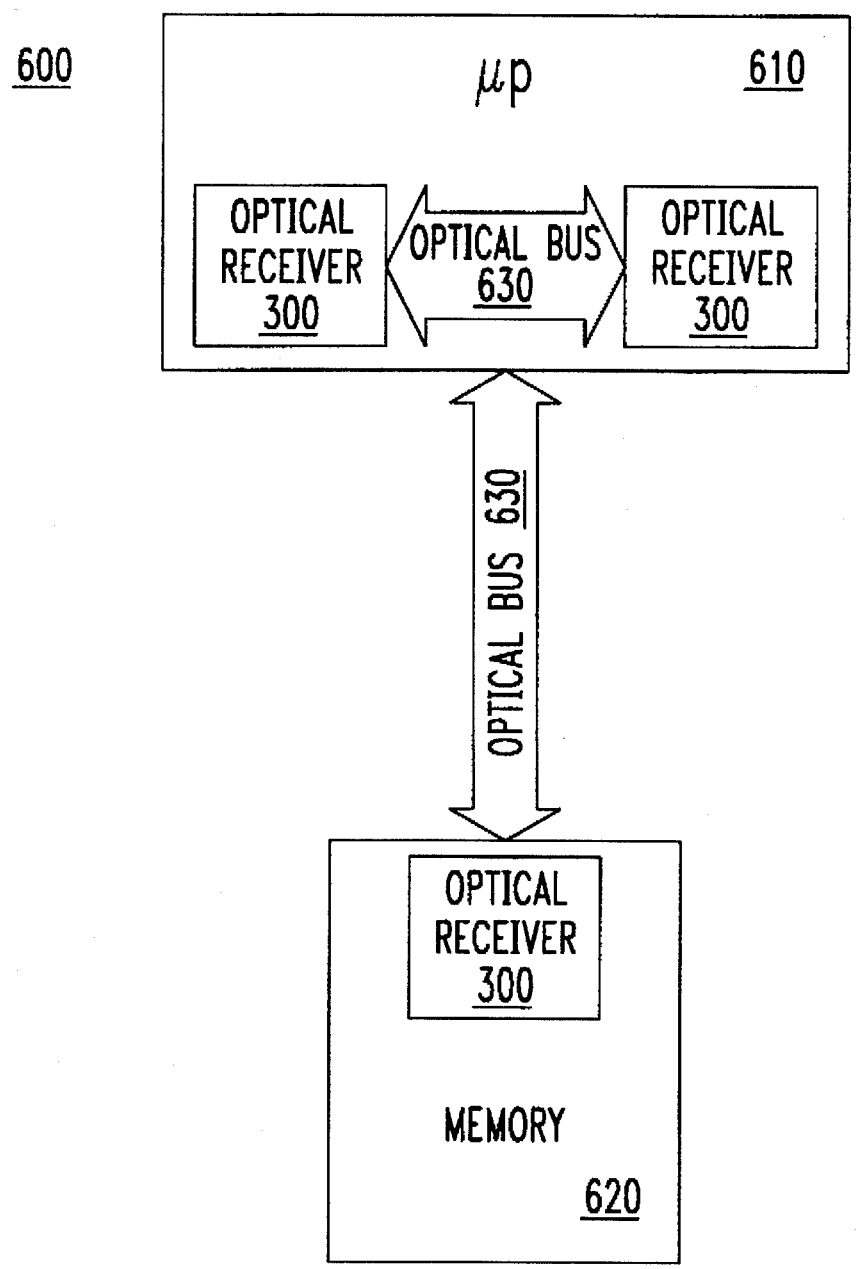
FIG. 6 illustrates a high-level block diagram of an exemplary optoelectronic data processing system.

Turning now to FIG. 6, illustrated is a high-level block diagram of an exemplary optoelectronic data processing system 600 suitably employing the optical receiver 300 of the present invention. The exemplary optoelectronic data processing system 600 is comprised of exemplary microprocessor 610 and exemplary memory 620, interconnected by exemplary optical bus 630. Exemplary microprocessor 610 and exemplary memory 620, both of conventional design known to the art of digital processing systems, are suitably adapted to utilize optical data transmission means employing the optical receiver 300 of the present invention. The optical data transmission is accomplished by means of suitably designed optical transmitters, suitably designed optical bus 630, and optical receiver 300 of the present invention. The optical data transmission may be within the integrated circuitry of exemplary microprocessor 610 and between exemplary microprocessor 610 and other digital processing circuitry, such as exemplary memory 620. Those skilled in the art of digital processing circuitry will recognize that exemplary optoelectronic data processing system 600 may be replaced by, or combined with, any suitable processing system operative in accordance with the principles of the present invention, including videophones, telephones, televisions, pagers, sophisticated calculators, and hand-held, laptop/notebook, mini, mainframe and super computers, as well as processing system network combinations of the same.

Although the present invention has been described in detail, those skilled in the art should understand that they can make various changes, substitutions and alterations herein without departing from the spirit and scope of the invention in its broadest form.

What is claimed is:

1. An optical receiver, comprising:
    an optical sensor for receiving an optical signal, generating in response thereto an analog electrical signal and transmitting said analog electrical signal therefrom along an electrical path; and
    a sense amplifier having cross-coupled inverting amplifiers and a clock input, at least one of first and second inputs of said cross-coupled inverting amplifiers coupled to said electrical path to allow said sense amplifier to detect said analog electrical signal when a clock signal at said clock input is high, regenerative feedback within said sense amplifier driving first and second outputs of said cross-coupled inverting amplifiers to complementary logic levels when said clock signal is low, said clock signal controlling said regenerative feedback of said sense amplifier to amplify said analog electrical signal into said output electrical signal provided at said first and second outputs and suitable for use by digital circuitry.

2. The receiver as recited in claim 1 wherein said clock signal is selected from the group consisting of:
    an electrical signal, and
    an optical signal.

3. The receiver as recited in claim 1 wherein one of said first and second inputs is coupled to an electrical reference circuit.

4. The receiver as recited in claim 1 wherein said optical sensor is selected from the group consisting of:
    a p-i-n photo diode, and
    a metal semiconductor metal (MSM) photo diode.

5. The receiver as recited in claim 1 wherein said output electrical signal is provided at a complementary metal oxide semiconductor (CMOS) logic level.

6. The receiver as recited in claim 1 wherein said inverting amplifiers comprise a plurality of field effect transistors (FETs).

7. The receiver as recited in claim 1 wherein said analog electrical signal corresponds to a bit period of less than 10 nanoseconds.

8. A method of converting an optical signal into an output electrical signal suitable for use by digital circuitry, comprising the steps of:
    receiving said optical signal into an optical sensor, said optical sensor generating in response thereto an analog electrical signal and transmitting said analog electrical signal to a sense amplifier having cross-coupled inverting amplifiers with first and second inputs and a clock input; and
    detecting said analog electrical signal from said optical sensor in said sense amplifier when a clock signal at said clock input is high, regenerative feedback within said sense amplifier driving first and second outputs of said cross-coupled inverting amplifiers to complementary logic levels when said clock signal is low, said clock signal controlling said regenerative feedback of said sense amplifier to amplify said analog electrical signal into said output electrical signal provided at said first and second outputs and suitable for use by digital circuitry.

9. The method as recited in claim 8 wherein said clock signal is selected from the group consisting of:
    an electrical signal, and
    an optical signal.

10. The method as recited in claim 8 further comprising the step of coupling one of said first and second inputs to an electrical reference circuit.

11. The method as recited in claim 8 wherein said optical sensor is selected from the group consisting of:
    a p-i-n photo diode, and
    a metal semiconductor metal (MSM) photo diode.

12. The method as recited in claim 8 wherein said step of detecting comprises the step of providing said output electrical signal at a complementary metal oxide semiconductor (CMOS) logic level.

13. The method as recited in claim 8 wherein said inverting amplifiers comprise a plurality of field effect transistors (FETs).

14. The method as recited in claim 8 wherein said step of receiving comprises the step of generating an analog electrical signal corresponding to a bit period of less than 10 nanoseconds.

15. An optoelectronic data processing system, comprising:
- electronic general purpose digital data processing and storage circuitry for receiving, processing, generating and transmitting data in electronic form; and
- optical data communicating circuitry for communicating data with said electronic general purpose data processing and storage circuitry, said optical data communicating circuitry comprising optical transmitters and receivers coupled to one another by at least one optical bus, each of said optical receivers including:
  - an optical sensor for receiving an optical signal, generating in response thereto an analog electrical signal and transmitting said analog electrical signal therefrom along an electrical path, and
  - a sense amplifier having cross-coupled inverting amplifiers and a clock input, at least one of first and second inputs of said cross-coupled inverting amplifiers coupled to said electrical path to allow said sense amplifier to detect said analog electrical signal when a clock signal at said clock input is high, regenerative feedback within said sense amplifier driving first and second outputs of said cross-coupled inverting amplifiers to complementary logic levels when said clock signal is low, said clock signal controlling said regenerative feedback of said sense amplifier to amplify said analog electrical signal into said output electrical signal provided at said first and second outputs and suitable for use by said electronic general purpose digital data processing and storage circuitry.

16. The system as recited in claim 15 wherein said clock signal is selected from the group consisting of:
- an electrical signal, and
- an optical signal.

17. The system as recited in claim 15 wherein one of said first and second inputs is coupled to an electrical reference circuit.

18. The system as recited in claim 15 wherein said optical sensor is selected from the group consisting of:
- a p-i-n photo diode, and
- a metal semiconductor metal (MSM) photo diode.

19. The system as recited in claim 15 wherein said electronic general purpose digital data processing and storage circuitry is complementary metal oxide semiconductor (CMOS) circuitry, said output electrical signal being provided at a CMOS logic level.

20. The system as recited in claim 15 wherein analog electrical signal corresponds to a bit period of less than 10 nanoseconds.

* * * * *